(12) United States Patent
Artis et al.

(10) Patent No.: US 7,358,917 B2
(45) Date of Patent: Apr. 15, 2008

(54) FREQUENCY DISPERSIVE ANTENNA SUITABLE IN PARTICULAR FOR THE PINPOINTING OF OBJECTS OVER AN ANGULAR DOMAIN GREATER THAN THE NATURAL WIDTH OF THE SAID ANTENNA

(75) Inventors: Jean-Paul Artis, Plouzane (FR); Gérard Debionne, Mery sur Oise (FR); Georges Guillaumot, Tigery (FR); Maxence Marcant, Milizac (FR)

(73) Assignee: Thales (FR)

(*) Notice: Subject to any disclaimer, the term of this patent is extended or adjusted under 35 U.S.C. 154(b) by 0 days.

(21) Appl. No.: 11/445,467

(22) Filed: Jun. 2, 2006

(65) Prior Publication Data

US 2007/0030209 A1 Feb. 8, 2007

(30) Foreign Application Priority Data

Jun. 3, 2005 (FR) .................................. 05 05647

(51) Int. Cl.
*H01Q 13/10* (2006.01)
(52) U.S. Cl. ...................................... 343/771; 343/772
(58) Field of Classification Search ................ 343/771, 343/770, 768, 772, 776
See application file for complete search history.

(56) References Cited

U.S. PATENT DOCUMENTS

| 2,981,948 | A |   | 4/1961 | Kurtz |
| 4,099,181 | A | * | 7/1978 | Scillieri et al. ............. 343/777 |
| 4,742,355 | A |   | 5/1988 | Wolfson et al. |
| 4,958,166 | A | * | 9/1990 | Branigan et al. ........... 343/771 |
| 5,543,810 | A | * | 8/1996 | Park ........................... 343/771 |
| 7,088,290 | B2 | * | 8/2006 | Ohno et al. .......... 343/700 MS |

FOREIGN PATENT DOCUMENTS

GB    1220395    1/1971

* cited by examiner

*Primary Examiner*—Hoang V Nguyen
(74) *Attorney, Agent, or Firm*—Lowe Hauptman Ham & Berner, LLP

(57) ABSTRACT

The invention relates to a frequency dispersive antenna. The antenna comprises at least one top part and one bottom part. The top part and the bottom part comprises radiating waveguides coupled electromagnetically by way of coupling slots to a feed waveguide. The feed waveguide of the top part of the antenna does not comprise any coupling slot over a length L. The length L is chosen so as to achieve an electric length substantially equal to the electric length of the feed guide coupled to the bottom part of the antenna. In particular, the invention applies to the pinpointing of meteorological phenomena over an angular domain greater than the natural width of an airborne antenna.

5 Claims, 3 Drawing Sheets

Figure 1:
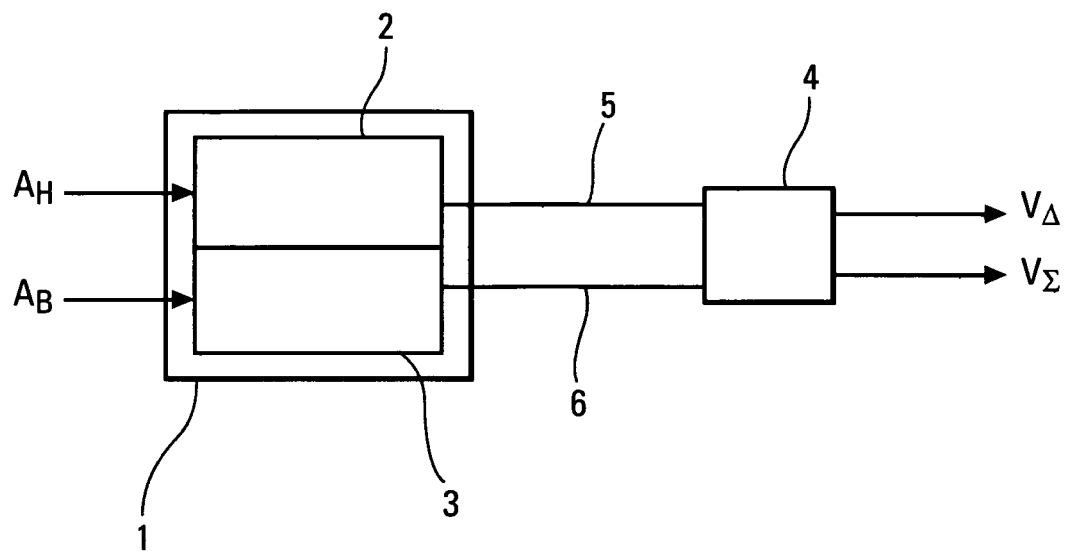

FREQUENCY DISPERSIVE ANTENNA SUITABLE IN PARTICULAR FOR THE PINPOINTING OF OBJECTS OVER AN ANGULAR DOMAIN GREATER THAN THE NATURAL WIDTH OF THE SAID ANTENNA

The invention relates to a frequency dispersive antenna. In particular, the invention applies to the pinpointing of meteorological phenomena over an angular domain greater than the natural width of an airborne antenna.

Airborne meteorological radars comprise for the most part an antenna whose scanning in bearing and in elevation is carried out mechanically. The inertia of the antenna as well as the desired degree of agility of the beam influence the choice of the motors included in the scanning mechanisms. Such mechanisms may by dint of their complexity become particularly expensive.

The use of frequency dispersive antennas seems to afford a suitable solution to these problems, in the case of an airborne meteorological radar for example. By varying the frequency of the RF radar signal over a given frequency span, it is thus possible to achieve electronic scanning of the beam in a plane over a few degrees. This method allows the analysis of sufficient elevational angular domains in the case of an airborne antenna suitable for the detection and for the pinpointing of meteorological phenomena.

In order to pinpoint in elevation a meteorological phenomenon such as a cloud for example, the meteorological radar can in particular implement a method comprising a first step of measurement of the power of the RF signal received for two sufficiently different directions of pointing in elevation and a second step of comparison between these two measurements. This known method, called bi-lobing in the literature, is however not robust in relation to the frequency fluctuations of the Radar Cross Section of the object to be pinpointed. But the use of this processing on a radar comprising a frequency dispersive antenna, where the frequency variation remains the very principle of the off-boresighting of the antenna, is therefore problematic.

This processing does not therefore make it possible on a frequency dispersive antenna to attain sufficient accuracy of angular pinpointing over significant domains.

The invention is in particular aimed at alleviating the aforesaid drawbacks. For this purpose, the invention is aimed at an antenna comprising at least one top part and one bottom part. The top part comprises radiating waveguides coupled electromagnetically by way of coupling slots to a feed waveguide. The bottom part comprises radiating waveguides coupled electromagnetically by way of coupling slots to a feed waveguide. The variation of the direction of pointing of the beam of the antenna is obtained in at least one plane by varying the frequency of the waves guided by the feed waveguides. The feed waveguide of the top part of the antenna does not comprise any coupling slot over a length L. The length L is chosen so as to achieve an electric length substantially equal to the electric length of the feed guide coupled to the bottom part of the antenna.

According to an aspect of the invention, the feed waveguides operate in progressive mode.

According to another aspect of the invention, the radiating waveguides operate in resonant mode.

The feed waveguide of the top part of the antenna can in particular comprise, in the length L, elements for adaptation and for phase shifting of the guided electromagnetic waves. The value of the phase shift then induced by the adaptation and phase shifting elements is then for example substantially equal to the disturbance in phase engendered by the coupling slots of the feed waveguide of the bottom part of the antenna.

The invention has in particular as advantages the ensuring of the phase continuity of the guided electromagnetic waves, in particular without any break in value or in slope at the junction of the various parts of the antenna.

Figure 2:
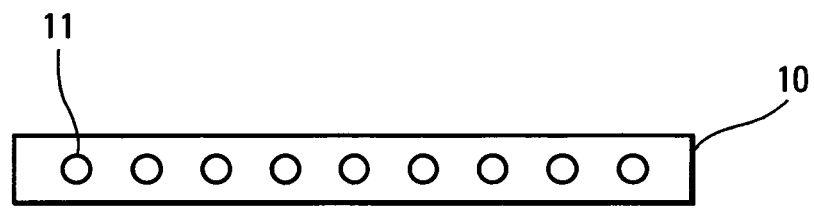
Figure 3:
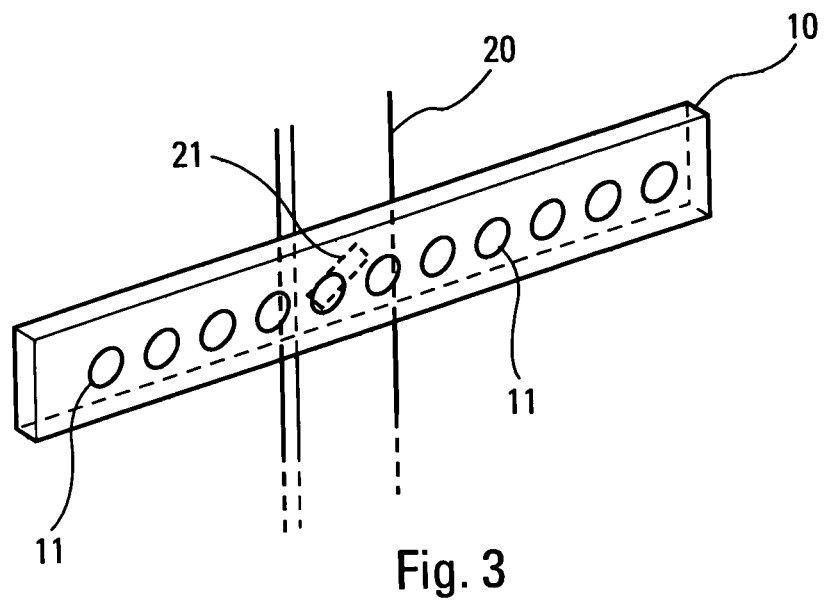
Figure 4:
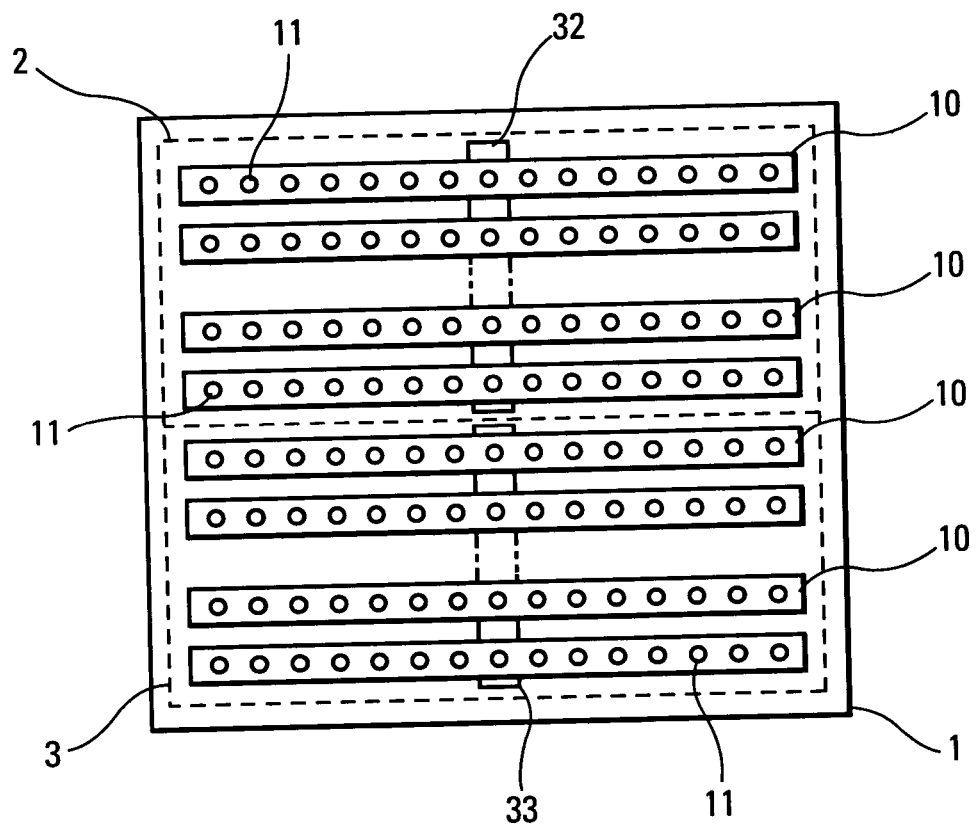
Figure 5:
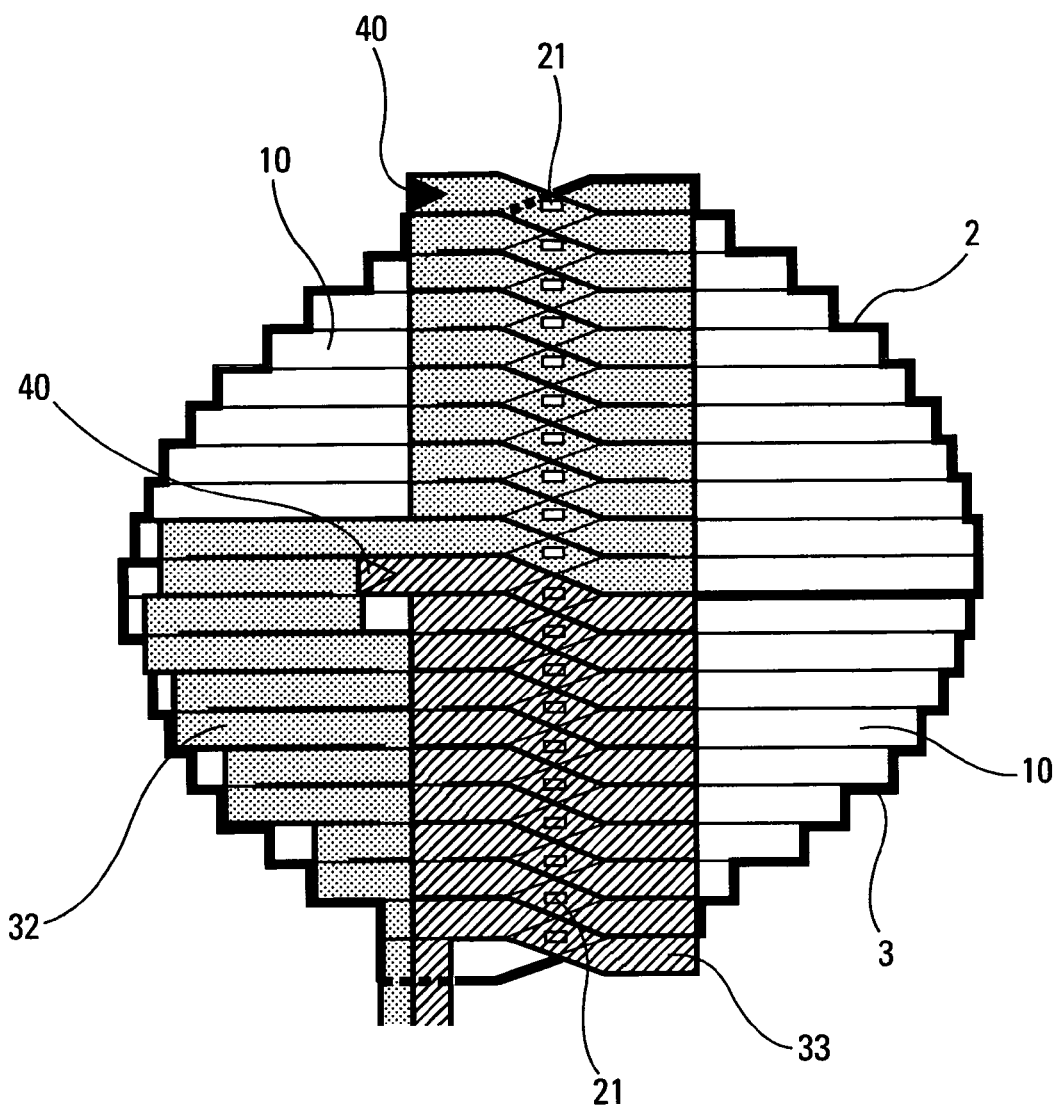

Other characteristics and advantages of the invention will appear with the aid of the description which follows, offered in relation to the appended drawings which represent:

FIG. 1, the basic principle of an antenna using a monopulse method to determine the angular position of an object, for example its elevation;

FIG. 2, a radiating waveguide;

FIG. 3, an electromagnetic coupling between a radiating waveguide comprising radiating slots and a feed waveguide;

FIG. 4, an exemplary implementation of the antenna using a monopulse method to determine the elevation of an object;

FIG. 5, an antenna according to the invention seen from the rear.

The description which follows is illustrated on the basis of a meteorological airborne radar comprising an antenna whose scanning principle relies on frequency dispersivity. However, the invention applies to any device comprising a frequency dispersive antenna.

One of the main functions of an airborne meteorological radar is the pinpointing in elevation of meteorological phenomena, such as clouds for example. In the case of a radar comprising a frequency dispersive antenna, the methods called bi-lobing in the literature are unsuitable. Specifically, these methods are not robust in relation to frequency fluctuations of the radar echo returned by the target, the frequency variation being the very principle of the off-boresighting of an antenna with frequency dispersivity. There exist other types of methods, in particular monopulse methods, making it possible to determine the elevation of an object.

FIG. 1 illustrates the basic principle of an antenna using a monopulse method to determine the angular position of an object, for example its elevation. An antenna of monopulse type has in particular the characteristic that one and the same radar echo simultaneously traverses two reception pathways, thus making it possible to precisely pinpoint the angular position of an object situated in the beam. FIG. 1 shows an antenna 1 of monopulse type in the plane of the elevation. The antenna 1 comprises a top part 2 and a bottom part 3 on which radiating slots are disposed. The top part 2 receives electromagnetic waves by way of feed means $A_H$. Likewise, the bottom part 3 receives electromagnetic waves by way of feed means $A_B$. The electromagnetic wave feed means $A_H$ of the top part 2 of the antenna 1 are differentiated from the electromagnetic wave feed means $A_B$ of the bottom part 3 of the antenna 1. The RF signals resulting from the reception of an incident wave on the surface of the top part 2 of the antenna 1 are conveyed by a pathway 5 towards a magic tee 4. Likewise, the RF signals resulting from the reception of an incident wave on the surface of the bottom part 3 of the antenna 1 are conveyed by a pathway 6 towards the magic tee 4. The magic tee 4 forms a corresponding pathway $V_\Sigma$ the sum of the RF signals received on the pathways 5 and 6. The magic tee 4 also forms a pathway $V_\Delta$ corresponding to the difference of the RF signals received on the pathways 5 and 6. It is on the basis of the pathways $V_\Sigma$ and $V_\Delta$ that the radar determines by known methods termed monopulse boresighting the elevation of the object pointed at by the antenna 1.

The invention is in particular aimed at a radar comprising a frequency dispersive antenna 1 and implementing a method of monopulse type as described previously. The top part 2 and the bottom part 3 of the antenna 1 comprise in particular radiating waveguides. These radiating waveguides can be disposed for example horizontally.

FIG. 2 shows one of these radiating waveguides 10. Radiating slots 11 are made along the radiating waveguide 10. The radiating slots 11 are in particular suitable for the emission and for the reception of RF signals. The radiating slots 11 made on the radiating waveguide 10 form a group of radiating slots 11. When an electromagnetic wave traverses the radiating waveguide 10, the group of radiating slots 11 by electromagnetic coupling receives an electromagnetic signal. Reciprocally, when an incident electromagnetic wave is sensed by the group of radiating slots 11, an electromagnetic wave traverses the radiating waveguide 10 on account of the electromagnetic coupling.

In an embodiment, the radiating waveguide 10 can be a flat slot guide operating in resonant mode. For this purpose, short-circuits are disposed at each end of the radiating waveguide 10.

FIG. 3 illustrates the electromagnetic coupling between a radiating waveguide 10 comprising radiating slots 11 and a feed waveguide 20. The antenna comprises in particular at least one feed waveguide 20 here positioned vertically. Each radiating waveguide 10 is coupled electromagnetically with one of the feed waveguides 20. This arrangement in particular makes it possible to be able to produce electromagnetic coupling via a coupling slot 21 between the feed waveguide 20 and the radiating waveguide 10.

In an embodiment, the feed waveguides 20 operate in progressive mode. For this purpose, suitable loads are positioned at one of the ends of each feed waveguide 20. The waves feeding each feed waveguide 20 are then not reflected by the end of the feed waveguides 20.

FIG. 4 shows an exemplary implementation of the antenna 1 using a monopulse method to determine the angular position of an object, for example its elevation. The antenna 1 comprises a top part 2 and a bottom part 3. The top part 2 of the antenna 1 comprises radiating waveguides 10 comprising radiating slots 11. Likewise, the bottom part 3 of the antenna 1 comprises radiating waveguides 10 comprising radiating slots 11. The arrangement of the top part 2 and bottom part 3 is given by way of example. It would be equally pertinent to separate the antenna into groups of waveguides 10 radiating in a few directions as may be.

To implement the antenna 1 using a monopulse method, the top part 2 and the bottom part 3 of the antenna 1 must be fed by electromagnetic wave separately. Thus the radiating waveguides 10 of the top part 2 of the antenna 1 are coupled electromagnetically to a feed waveguide 32 while the radiating waveguides 10 of the bottom part 3 of the antenna 1 are coupled electromagnetically to another feed waveguide 33. The feed of an antenna 1 according to the invention being frequency dispersive, the feed waveguides 32 and 33 must therefore be traversed in the same sense by the electromagnetic waves.

FIG. 5 shows an antenna according to the invention seen from the rear. The radiating waveguides 10 of the top part 2 of the antenna 1 are coupled electromagnetically to a feed waveguide 32 by way of coupling slots 21. Likewise, the radiating waveguides 10 of the bottom part 3 of the antenna 1 are coupled electromagnetically to a feed waveguide 33 by way of coupling slots 21. At the ends of the feed waveguides 32 and 33 on the antenna 1 are disposed suitable loads 40 so that the feed waveguides 32 and 33 operate in progressive mode.

In an embodiment, the feed waveguide 32 coupled to the top part 2 of the antenna 1 is a flat slot guide. Over a length L, the feed waveguide 32 comprises neither any coupling slot 21 nor any radiating slot 11.

In a microwave line like for example a waveguide, the waves propagate in a guided manner according to a guided wavelength in general different from the wavelength in free space in air. In the case of a waveguide with the guided wavelength $L_G$, for a given phase shift f, the electric length $L_E$ is expressed according to the expression $$L_E = \frac{f * L_G}{2\pi}.$$

The electric length $L_E$ is the electric length corresponding to the phase shift f for a given microwave line. Two legs of two different lines can have the same electric length and different physical lengths, signifying that a signal of like frequency will have the same phase on exiting the two lines. The difference in physical length is compensated by the difference in the guided wavelength $L_G$, for example, or by the introduction of phase shifter elements.

According to the invention, the length L is chosen so as to achieve an electric length substantially equal to the electric length of the feed guide 33 coupled to the bottom part 3 of the antenna 1. The feed waveguide 32 can in particular comprise over this length L adaptation elements reproducing on the signal traversing the feed guide 32, the phase shifts introduced by the coupling slots of the feed guide 33, in such a way that the signal in the feed guide 32 has the same phase, at the level of its first coupling slot 21, as the signal originating from a unique guide having firstly traversed a distance equal to that of the feed waveguide 33 would have had.

Coupling slots 21 are thereafter disposed on the remaining length of the feed waveguide 32, each slot being opposite a radiating waveguide 10 of the top part 2 of the antenna 1. The feed waveguide 32 does not therefore comprise any coupling slot 21 for coupling over the length L. The electromagnetic wave reaching the top part 2 of the antenna 1 is thus delayed. The phase of this electromagnetic wave, when the latter reaches the top part 2 of the antenna 1, is equal to the phase of an electromagnetic wave which would have traversed the feed waveguide 33 of the bottom part 3 of the antenna 1. Reciprocally, the phase of the electromagnetic wave reaching the end opposite from that where the suitable load 40 of the feed waveguide 32 is situated is equal to the phase of an electromagnetic wave which would have traversed the feed waveguide 32 of the top part of the antenna 1 and the feed waveguide 33 of the bottom part 3 of the antenna 1. The part of the feed waveguide 32 not comprising any coupling slot 21 can in particular comprise adaptation and phase shifting elements for the purposes of fine adjustments of the phase shift of the guided electromagnetic waves. These elements make it possible for example to take into account the disturbances in phase produced by the coupling slots 21 of the feed waveguide 33 of the bottom part 3 of the antenna 1.

In the case of the feed waveguide 33 of the bottom part 3 of the antenna 1, the electromagnetic coupling with the radiating waveguides 10 is defined by a law of increasing coupling according to the position of the slots on a vertical axis. A slot situated underneath according to the vertical axis another slot will have a weaker coupling law than the latter. Symmetrically, in the case of the feed waveguide 32 of the top part 2 of the antenna 1, the electromagnetic coupling with the radiating waveguides 10 is defined by a law of decreasing coupling according to the position of the slots on a vertical axis. A slot situated underneath according to the vertical axis another slot will have a stronger coupling law than the latter. The application of these rules results in a weighting law useful for the upkeep of optimal levels of sidelobes of the antenna 1.

In another embodiment, the suitable loads 40 are in particular parametrized so that the difference between the energy incident on the bottom part 3 and top part 2 of the antenna 1 makes it possible to guarantee a trough in difference pathway at the desired level.

In an embodiment, the radiating waveguides 10 comprise at least three adjacent legs. The angle between the first leg and the central leg is in the clockwise sense greater than or equal to 90 degrees and less than 180 degrees while the angle between the central leg and the third leg is in the anticlockwise sense greater than or equal to 90 degrees and less than 180 degrees. The coupling slot 21 is disposed on the rear face of the central leg of each radiating waveguide 10. The feed waveguides 32 and 33 comprise a vertical element stack, each element comprising at least three adjacent legs. The angle between the first leg and the central leg is in the anticlockwise sense greater than or equal to 90 degrees and less than 180 degrees while the angle between the central leg and the third leg is in the clockwise sense greater than or equal to 90 degrees and less than 180 degrees. The coupling slot 21 is disposed on the front face of the central leg of each element. The central leg of each radiating waveguide 10 therefore crosses the central leg of an element 23 of one of the feed waveguides 32 and 33.

In the case of a meteorological radar, the antenna 1 operates in band X. The radiating waveguides 10 as well as the feed waveguides 32 and 33 can for example be flat waveguides with slots of outside dimensions of about 23 mm for the large side and between 5 and 10 mm inside dimension for the small side. The characteristics of the antenna make it possible to obtain an off-boresighting of the beam in elevation of 60 degrees per gigahertz. It follows from this that for an electric distance of 157 mm of the feed waveguides 32 and 33, the beam scan sweep in elevation extends from −3° to 3° if the frequency of the electromagnetic wave varies in a band of 100 MHz. The variation in pointing of the beam of the antenna 1 as a function of the frequency of the electromagnetic waves does not affect the structure of the sidelobes. Likewise, the boresighting slope hardly varies with frequency in a band of 100 MHz.

The invention claimed is:

1. An antenna comprising at least:
    one top part, comprising radiating waveguides coupled electromagnetically by way of coupling slots to a first feed waveguide; and
    one bottom part, comprising radiating waveguides coupled electromagnetically by way of coupling slots to a second feed waveguide;
    wherein a variation in beam pointing direction of the antenna is obtained in at least one plane by varying the frequency of waves guided by the first and second feed waveguides, the first feed waveguide of the top part of the antenna not comprising any coupling slot over a length L, the length L being chosen so as to achieve an electric length substantially equal to an electric length of the second feed waveguide coupled to the bottom part of the antenna.

2. The antenna according to claim 1, wherein the feed waveguides operate in progressive mode.

3. The antenna according to claim 1, wherein the radiating waveguides operate in resonant mode.

4. The antenna according to claim 1, wherein the first feed waveguide of the top part of the antenna comprises, in the length L, elements for adaptation and for phase shifting of guided electromagnetic waves.

5. The antenna according to claim 4, wherein the value of the phase shift induced by the adaptation and phase shifting elements is substantially equal to the disturbance in phase engendered by the coupling slots of the second feed waveguide of the bottom part of the antenna.

\* \* \* \* \*